B. B. WALLACE.
WHEEL PLOW.
APPLICATION FILED FEB. 12, 1915.
1,269,138.
Patented June 11, 1918.
4 SHEETS—SHEET 2.
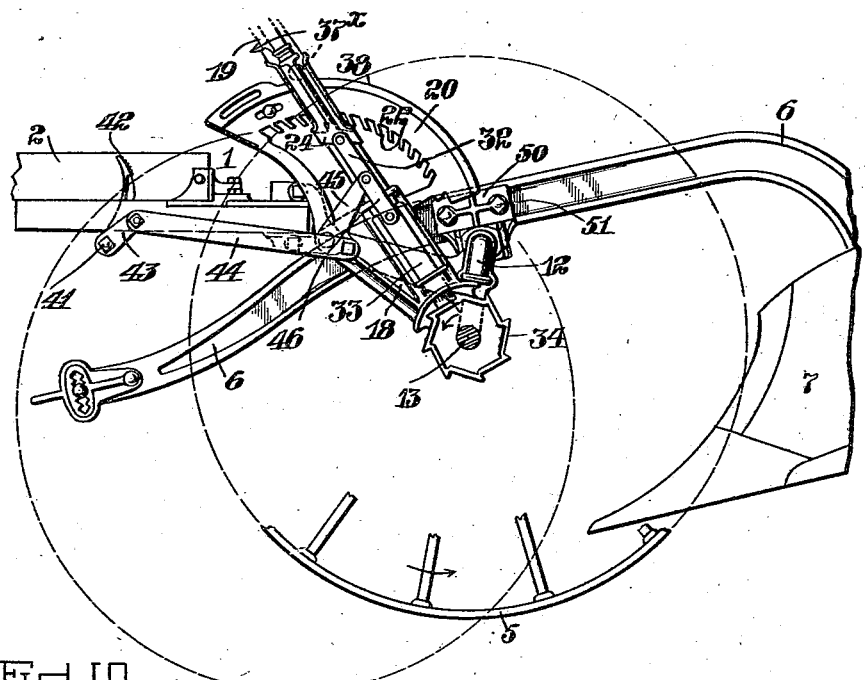
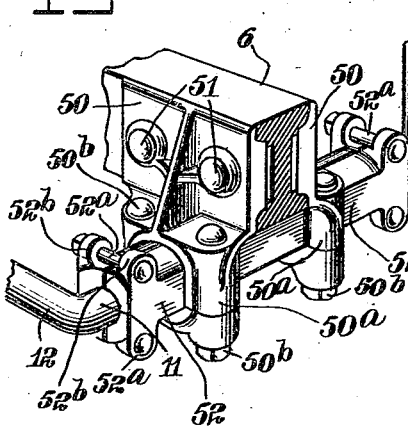
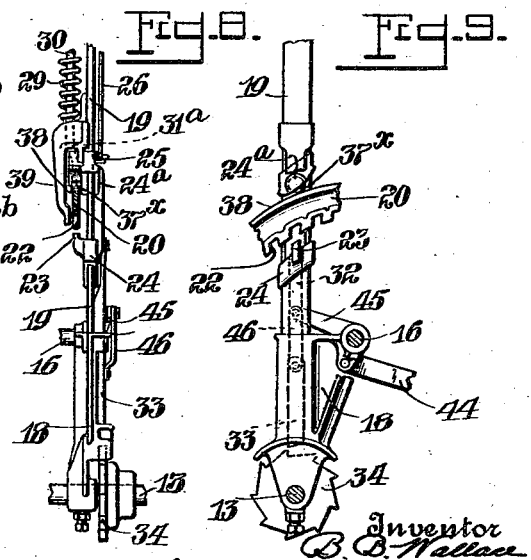

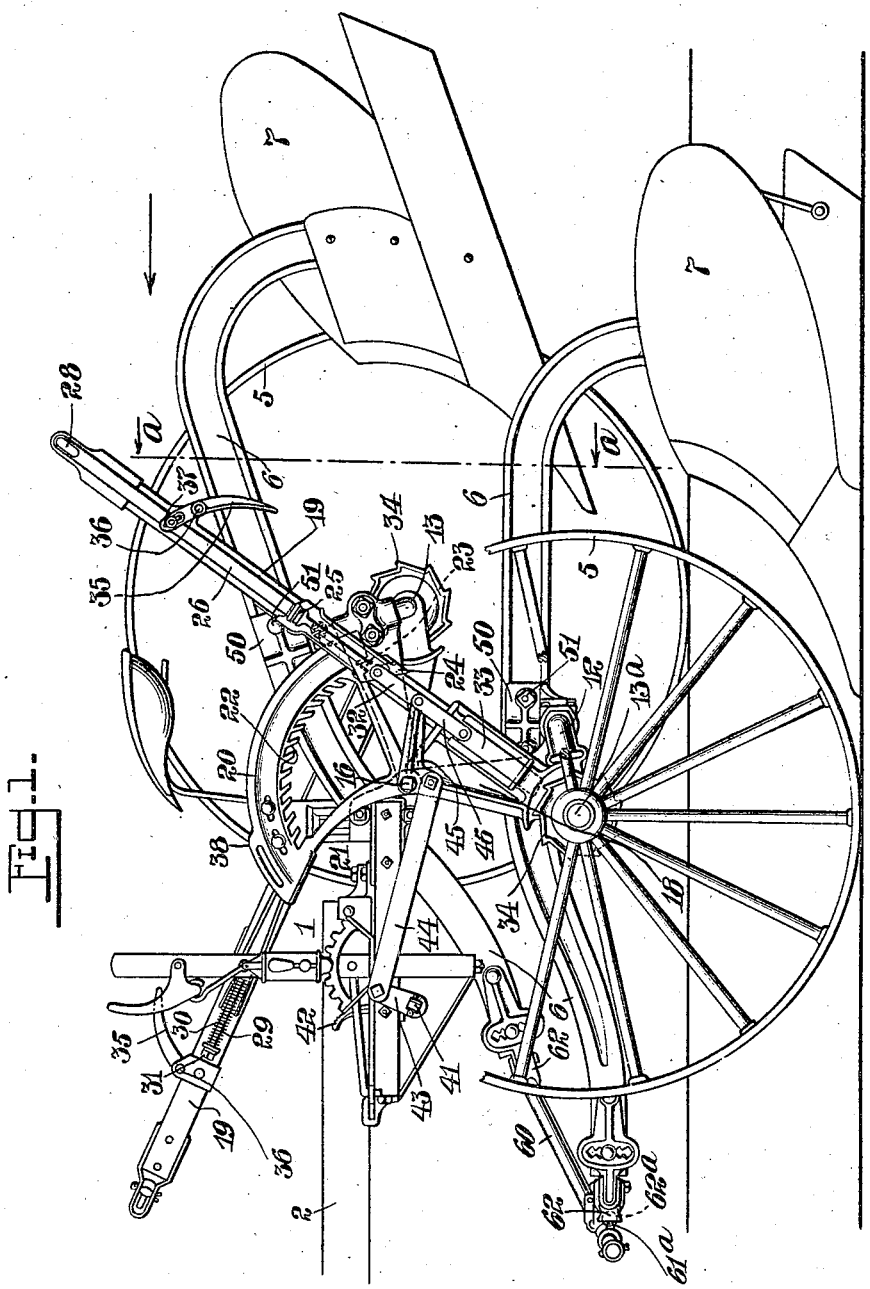

B. B. WALLACE.
WHEEL PLOW.
APPLICATION FILED FEB. 12, 1915.
1,269,138.
Patented June 11, 1918.
4 SHEETS—SHEET 3.
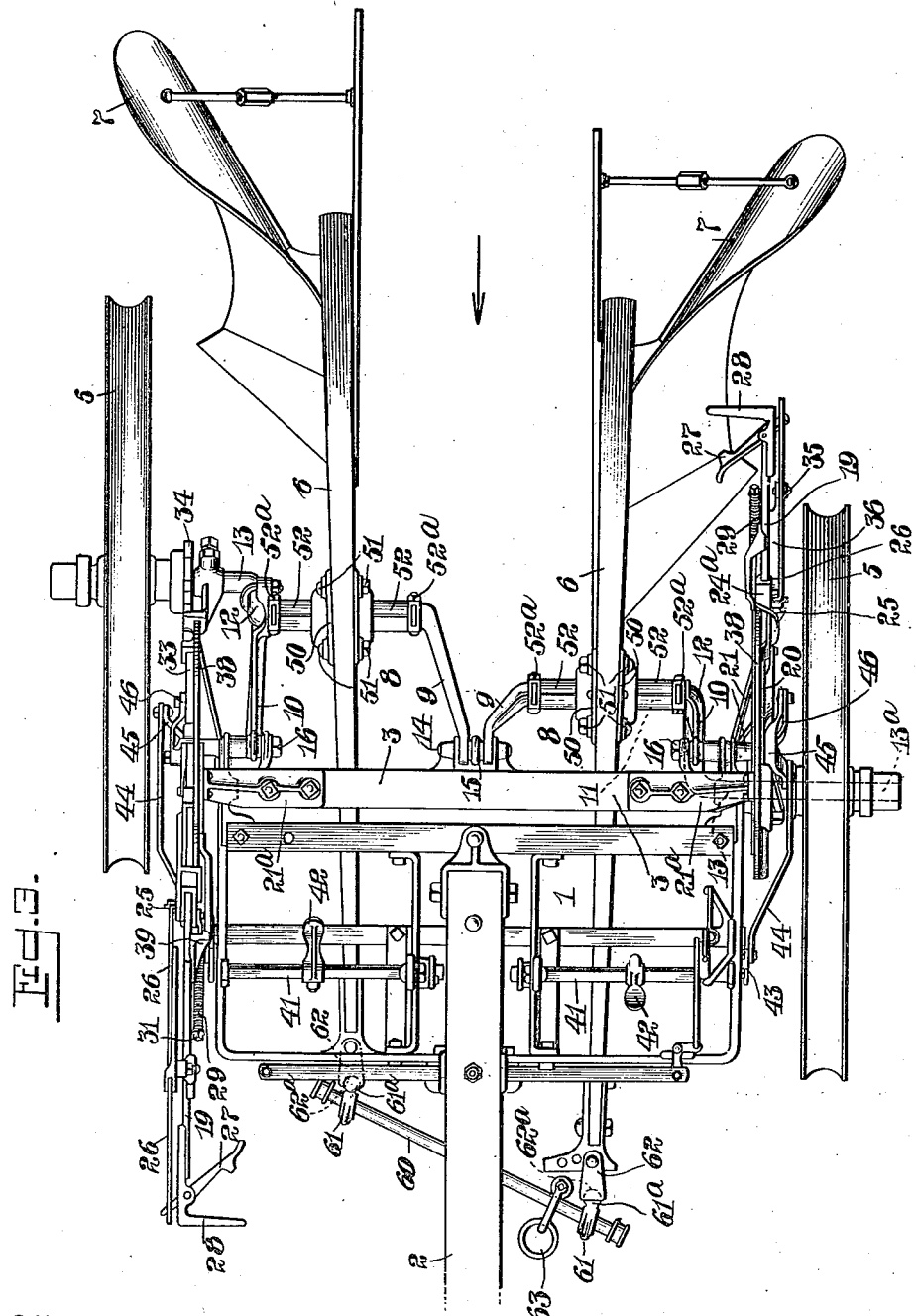
Witnesses:
E. F. Hotchkiss.
W. J. Reiter.
Inventor
B. B. Wallace
By his Attorneys
Rogers, Kennedy & Campbell

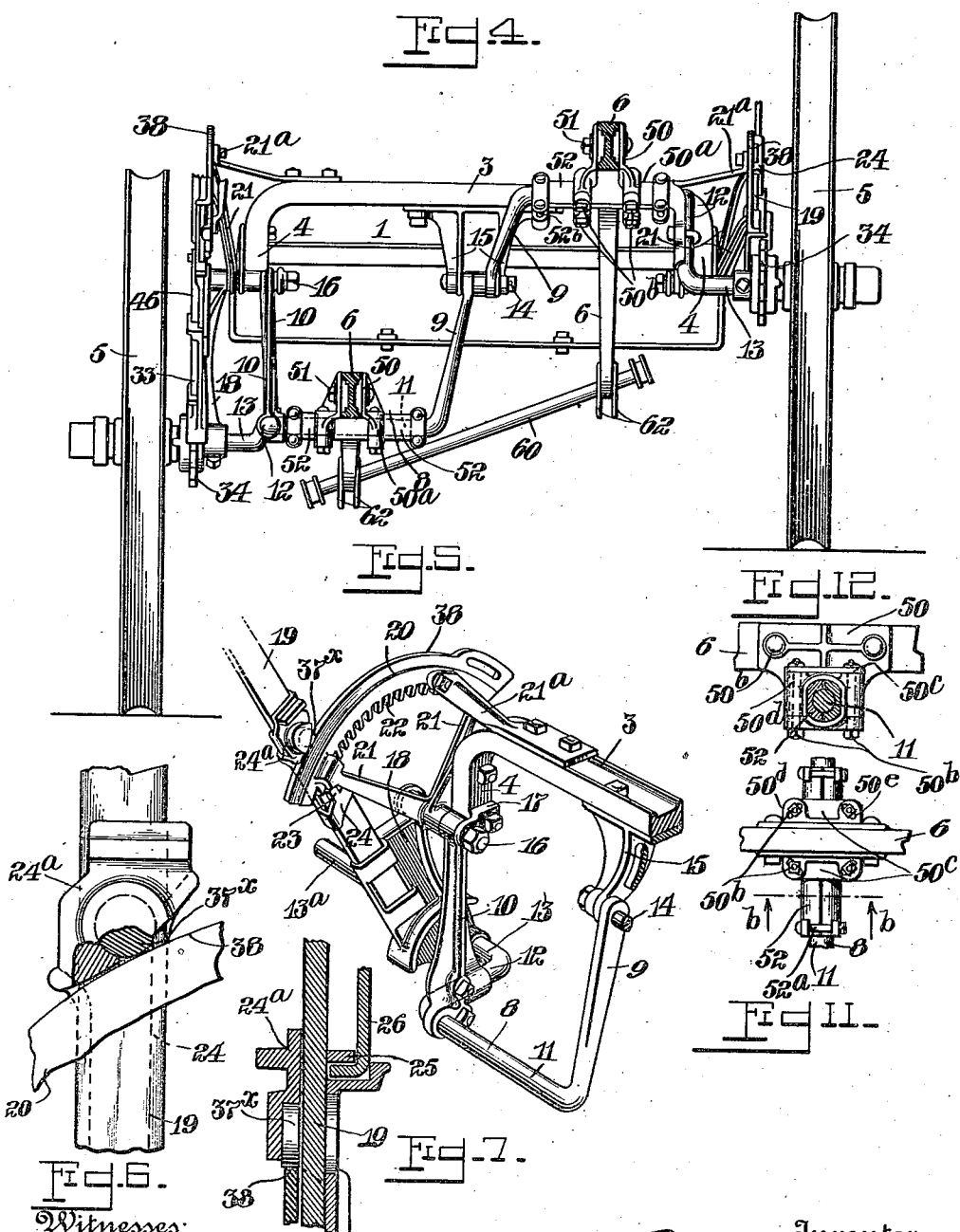

UNITED STATES PATENT OFFICE.

BENJAMIN B. WALLACE, OF POUGHKEEPSIE, NEW YORK, ASSIGNOR TO MOLINE PLOW COMPANY, A CORPORATION OF ILLINOIS.

WHEEL-PLOW.

1,269,138. Specification of Letters Patent. Patented June 11, 1918.

Application filed February 12, 1915. Serial No. 7,669.

*To all whom it may concern:*

Be it known that I, BENJAMIN B. WALLACE, a citizen of the United States, residing at Poughkeepsie, in the county of Dutchess and State of New York, have invented certain new and useful Improvements in Wheel-Plows, of which the following is a specification, reference being had therein to the accompanying drawing.

This invention relates to wheel plows, and has reference more particularly to that type of sulky plows comprising a frame supported by ground wheels movable up and down relatively thereto, and carrying plow beams also movable up and down relatively to the frame; and the invention consists of various improved features of detail relating to the means for controlling the up and down movements of the wheels and plow beams, the form and construction of the levers for adjusting the plow beams and wheels, to the means for the connection of the plow beams to their supporting parts, to the means for the connection of the draft to the plow beams, and to various other details, having in view, simplicity and strength of construction, and effectiveness in operation.

The invention is shown as embodied in a two-way sulky plow in which the plows point in the same direction but face in opposite directions, so that by the alternate action of the two plows the furrows may all be thrown in the same direction although the machine is drawn through the field in opposite directions for succeeding furrows, one of the ground wheels acting as a furrow wheel and the other as a land wheel, with one of the plows down in action and the other raised, when the machine is traveling in one direction, and the said wheels and plows being adjusted to opposite positions when the plow travels in the opposite direction. It is manifest, however, that the invention is applicable to other forms of plows, and also that the detailed form of the parts may be variously modified without departing from the spirit of the invention, the form of construction of the parts shown being merely by way of example. Further it will be understood that the invention is not limited to any particular form or construction of the parts except in so far as such limitations are specified in the claims.

In the accompanying drawings:

Figure 1 is a side elevation of a plow having my invention embodied therein, the near plow being shown lowered in action and the near wheel traveling in the furrow, while the other plow is shown elevated and its associated ground wheel traveling on the land.

Fig. 2 is a similar view showing the near plow elevated out of action, and its associated ground wheel likewise elevated to travel on the land, the position of the other wheel being indicated by dotted lines.

Fig. 3 is a top plan view of the machine with the parts in the position they occupy in Fig. 1.

Fig. 4 is a transverse sectional elevation on the line *a—a* of Fig. 1 as viewed from the rear.

Fig. 5 is an inside perspective sectional view of one of the swinging beam-supporting bails and its coöperating lifting lever.

Fig. 6 is a fragmentary sectional elevation of a detail of one of the lifting levers.

Fig. 7 is an edge view of the same partly in section.

Fig. 8 is an edge view of one of the lifting levers and adjacent parts with which it coöperates.

Fig. 9 is a side elevation of the same.

Fig. 10 is a sectional perspective view of the means for connecting the plow beam to the swinging bail.

Fig. 11 is a top plan view of the same in modified form.

Fig. 12 is a transverse sectional elevation on the line *b—b* of Fig. 11.

1 represents the frame of the machine, which is of rectangular form and has connected rigidly to it, the rear end of the draft tongue 2, in rear of which is a fixed transverse elevated frame-bar or beam 3, the ends of which are extended downwardly in the form of vertical arms 4. The frame is supported on opposite sides by ground wheels 5, 5, and it gives support to two fore and aft extending plow beams 6, 6, equipped in the present instance with mold board plows 7 pointing in the same direction, but facing respectively in opposite directions as shown in Fig. 3. The plow beams and ground wheels are adapted to be moved up and down relatively to the frame by suitable adjusting levers and mechanisms, and inasmuch as the construction and arrangement of the parts on the two sides of the machine are duplicates of each other, and independently controlled, a description of one set will suffice.

Each plow beam is connected, in the manner to be more fully described later on, with a swinging bail 8 (see Fig. 5) comprising an inner arm 9, an outer arm 10 parallel therewith, and a horizontal connecting arm 11, which latter arm is extended at its outer end forwardly as at 12, and is then extended transversely outwardly in the form of a transverse extension 13, the end of which is provided with a wheel spindle 13ª on which the ground wheel 5 is journaled. The upper end of arm 9 is journaled on a horizontal transverse pivot bolt 14 sustained by the lower ends of depending arms 15 on a bracket, bolted or otherwise fixedly secured to the under side of the frame bar 3, while the upper end of the outer arm 10 of the bail, is journaled on a transversely extending pivot bolt 16 sustained by a supporting lug 17 fixed to and extending rearwardly from the vertical arm 4 of the frame bar, the axes of the pivot bolts 14 and 16 being coincident so that the bail may swing about said coincident axes as a center, and in such swinging movements will cause the plow beam connected with the bail, and also the ground wheel, to move up and down. Mounted fixedly on the extension 13 of the bail, is a casting or frame 18, from which extends upwardly a lifting lever 19, the forward upper corner of which frame is mounted loosely on and sustained by the pivot bolt 16 so that in the swinging movements of the bail, the frame 18 and connected lever will rock about the bolt 16 as a center. The lever 19 coöperates with a segment frame 20 provided with two downwardly and inwardly extending arms 21, 21, connected together at their inner ends and mounted on and sustained by the pivot bolt 16, the said segment frame being maintained in fixed relation to the frame of the machine, by means of a brace 21 bolted at its inner end to the upper side of the frame bar 3, and bolted at its outer end to the upper portion of the segmental frame as clearly shown in Fig. 5. The under edge of the segmental portion of the frame 20 is provided with a number of teeth 22, between which is adapted to engage a locking tooth 23 on a slide 24 movable longitudinally on the lever 19, the said tooth when so engaged, serving to lock the lever to the segment frame, and thereby maintain the bail 8 in the particular position adjusted. The slide is provided on its outer side with laterally projecting lugs 25 between which is extended the lower inwardly bent end of an operating rod 26, so as to effect an interlocking connection with the slide as shown more particularly in Fig 7. The operating rod extends longitudinally of the lever 19 to its upper end where the rod is provided with an opening, in which extends the outer end of a hand latch 27 pivoted between its ends to the lever, and adapted in connection with a laterally extending handle 28 on the end of the lever, to be rocked on its axis by the hand of the operator, and thus move the rod 26 downwardly, by which action the slide 24 will be moved downwardly and will disengage the locking tooth 23 from the teeth on the segment frame. The slide 24 is normally urged outwardly on the lever 19, with the tooth 23 engaged between the teeth on the segment frame, by means of a spiral spring 29 encircling a rod 30 jointed at its lower end to the slide and provided on its upper end with a head 31, the said spring bearing at its upper end against this head, and at its lower end against a perforated lug 32, fixed to the lever and through which the rod 30 extends, so that when the hand latch 27 is moved toward the handle 28, slide 24 will be moved downwardly against the action of the spring, and the locking tooth thereon will be disengaged from the teeth on the segment frame, thus releasing the hand lever. The spring serves when the hand latch 27 is released, to again move the slide outwardly and engage the locking tooth thereon between the teeth on the segment frame. The hand levers 19 extend upwardly within reach of the driver occupying the driver's seat, and by means of these levers he may move the plows up and down out of and into action, and may regulate and control the depth of cut. For instance, with the parts in the position shown in Fig. 1, with the near plow locked down in action, if it is desired to raise the same partially or wholly out of the ground, the driver by first releasing the lever 19 by the manipulation of the hand latch 27 as before described, pulls the lever forwardly. This action, owing to the fact that the lever fulcrums on the pivoting bolt 16 as an axis, will swing the bail 8 rearwardly, which will elevate the near plow, and at the same time will raise the ground wheel associated with this plow. When the proper height of adjustment has been attained, the hand latch 27 is released, and spring 30 will act to move the slide 24 upwardly on the lever, and cause its locking tooth 23 to reëngage the segment, and the parts will be held in the position adjusted. It will be understood that both of the plows and their associated wheels may be adjusted in this manner independently of each other by the manipulation of their respective levers.

In order that the plows and their associated wheels may be elevated by the draft pull on the machine, in the travel of the latter, so as to relieve the driver of the effort of raising the parts, I connect the slide 24, by means of a downwardly extending link 32, with a plunger 33 mounted to slide back and forth longitudinally of the lever 19 between suitable guides at the lower end of the lever at the outer side of the same. The lower end of the plunger is adapted, when it is moved downwardly, to extend in the path of movement of ratchet teeth 34 movable with the ground wheel at the inner side of the same, and being engaged by the teeth, the lever 19 will be swung forwardly on its axis and the bail will consequently be swung rearwardly on said axis, with the result that the plow beam and associated ground wheel will be elevated, as before described, but in this instance by the power of the draft, and without the assistance of the driver. Normally the end of the plunger is held out of engagement with the ratchet teeth as shown in Fig. 1, by the spring 30 before alluded to. This power lift mechanism may be employed in the event that the driver desires to walk in rear of the machine, and wishes to elevate the plow entirely out of action, and to accomplish this result a hand lever 35 is provided, which is pivoted between its ends as at 36 to the lever 19 and has its front end jointed, as by pin and slot connection 37, to the operating rod 26 before alluded to, the said lever extending rearwardly as shown in Fig. 1. With the driver walking in the rear of the plow, he pulls up on hand lever 35, which action will thrust the operating rod 26 downwardly, and will project the end of the plunger 33 into the path of the ratchet teeth, which latter engaging the plunger, will throw the lifting lever forwardly and rocking the bail rearwardly, will raise the parts as before described. The raising action will continue, with the locking tooth 23 on slide 24 held out of engagement with the segment frame by the pressure of the ratchet tooth on the end of the plunger, until the plow has been elevated to its full extent, at which time a roller 37ˣ carried by the slide 24 and traveling on the outer curved edge of the segment frame, will engage a cam surface 38 extending upwardly from the edge of the segment frame near the forward end of the same, by which engagement the slide 24 will be moved upwardly and the plunger likewise moved upwardly and disengaged from the ratchet teeth, and at the same time the locking tooth 23 on the slide will be engaged between the teeth at the forward end of the segment frame, and the parts will be locked in elevated position. The plow may be again lowered into action, by the operation of hand latch 27 to disengage the locking tooth 23 from the segment, whereupon the lifting lever being released, the weight of the parts will cause the plow to descend into action.

Sufficient movement of the slide 24, by the action of the hand latch 27 is permitted, to allow of the engagement and disengagement of the locking tooth 23 with the teeth of the segment frame, without projecting the plunger 33 far enough to be engaged by the ratchet teeth on the ground wheel, so that the lifting levers may be operated by the driver to adjust the plows to any desired height, and to maintain them locked in their adjusted positions.

The roller 37ˣ before alluded to is mounted loosely in a socket in an extension 24ᵃ of the slide 24, so that the roller will have free rotation therein as it travels on the outer edge of the segment frame, the roller being placed in the socket before the lever is assembled in operative relation to the segment frame, and being held in its socket by its engagement with the edge of the segment frame. This construction and arrangement avoids the use of a special journal for mounting and sustaining the roller, or of other complicated or extraneous fastening means.

Adjacent the roller, the lifting lever has fixed to it a depending finger 39, which extends alongside the segmental portion of the segment frame, the function of this finger being, by its engagement with the side of the frame, to hold the lever close up to the same in its back and forth movements, and thus insure the proper engagement of the tooth 23 with the teeth on the segment frame, and the proper travel of the roller on the outer edge of the frame.

By means of the lifting levers and the operating mechanisms described, the driver is enabled to effect the raising of the plows either by hand, or by the power of the draft applied to propel the machine, which latter action, it will be remembered, is initiated by the hand lever 35 carried by the lifting lever as shown in Fig. 1. I propose to provide also for the initiation of this action, by mechanism under the control of the driver's feet, so that his hands will be wholly free to manage the draft team. This result is effected by means of the foot lever mechanism shown more particularly in Figs. 1, 2 and 3, where it will be seen that there are mounted in the forward portion of the frame of the machine, two transversely extending rock shafts 41, 41 arranged end to end and provided respectively with foot pedals 42, 42, the operation of which rock shafts will independently control the action of the draft power on the lifting mechanisms of the respective plows, and as the controlling mechanisms are the same for the two plows, a description of one set will suffice. The outer end of the rock shaft 41 has fixed to it an arm 43 which has connected with it, the forward end of a link 44 extending rearwardly at the outer side of the frame of the machine. The rear end of this link is jointed to the short arm of an elbow lever 45 mounted to rock on the pivotal axis 16 of the swinging bail 8, the long arm of this lever being jointed to the upper end of a link 46 whose lower end is pivoted to the plunger 33 before alluded to. As a result of this connection of the foot lever with the plunger, the forward movement of the foot lever will rock the elbow lever in a direction to project the plunger in the path of the ratchet teeth on the ground wheel, and in this manner the action of the draft power on the plow raising mechanism will be initiated, and the plow and its associated ground wheel, will be elevated by the draft in the manner before described.

It will be noted that the segment frames 20, the lifting levers 19 and the elbow levers 45 are all mounted on and sustained by the pivotal axis of the swinging bails. I deem this construction and arrangement of the parts of importance, in that it insures their support in the most favorable position for effective and direct action. The elbow lever 45 being pivoted on the axis of movement of lifting lever 19, will, when the lifting lever swings forwardly with the plunger 33 engaged by the ratchet teeth, pivot on the same axis as the lifting lever, so that its relation to the lifting lever will not be changed, and consequently the plunger connected with the elbow lever, will maintain engagement with the ratchet teeth, until it is positively disengaged by the cam surface 38 on the segment frame acting on the roller 37ˣ as before described.

The plow beam is connected with the horizontal arm 11 of its supporting bail, in such manner that the beam may be adjusted on the arm transversely to vary the distance between the plows; and it may be adjusted also in a horizontal plane about an upright axis to vary the inclination of the plow relatively to the line of travel. These various adjustments are provided for by means of the constructions shown in Figs. 10, 11 and 12, where it will be seen, referring more particularly to Fig. 10, that the beam of the plow is clamped firmly and fixedly between opposing longitudinally extending cheek plates 50, 50 by means of transverse bolts 51 extending through the plates and beams. The cheek plates are provided in their lower edges respectively with transversely extending sockets which receive a bearing sleeve 52 on the arm 11 of the bail, the cheek plates being firmly and fixedly clamped to the sleeve by means of two cap plates 50ᵃ formed with transverse sockets to receive the under side of the clamping sleeve, and firmly clamped to the cheek plates by means of vertical bolts 50ᵇ extending through the cheek plates and cap plates, the construction being such that by loosening the vertical bolts, the cheek plates and connected beam may be adjusted transversely on the bearing sleeve, and by again tightening up the bolts, the beam may be held firmly in its adjusted position.

The bearing sleeve 52 is in the form of two half sections formed in their adjacent faces respectively with semi-circular bearing sockets which, when the sections are applied to the opposite sides of the bail arm, will embrace the same loosely and form a bearing between them in which the arm may turn. The half sections are connected together by means of upper and lower longitudinally extending clamping bolts 52ᵃ which are passed through lugs 52ᵇ on the sections of the sleeve. The sides of the bearing sleeve are flat, and the sockets in the cheek plates are of corresponding form, so that the beam will be prevented from rocking on the sleeve, but may rock relatively to the bail arm in the swinging movements of the latter in raising and lowering the beam. The construction described forms in effect a jointed connection between the beam and bail arm, in which provision is made for adjusting the beam transversely of the arm.

Figs. 11 and 12 show a modification of the construction just described. In these figures it will be seen that the cheek plates are each in two sections, an upper section 50ᶜ carrying the vertical cheek plates proper, and a lower section 50ᵈ in which the sockets are formed and to which the cap plates are applied. The upper sections 50ᶜ are flat on their under sides and seated on the flat upper ends of the lower sections, said upper sections being provided with arcuate slots 50ᵉ through which the vertical clamping bolts 50ᵇ are passed, and which bolts secure the sections of the cheek plates and the caps together. The several arcuate slots extend in curves struck from a common center, the result being that the beam, clamped between the upper sections of the cheek plates, may be adjusted in a horizontal plane on the lower sections, about said common axis, and may be held fixedly in its adjusted position by tightening up the vertical bolts. By this means the beams may be set at varying angles relatively to the bails, to meet the varying conditions encountered in the practical operation of the machine in the field.

The draft is applied to the machine by the usual transverse draft bar 60 which is connected with the forward ends of the plow beams through the medium of draft heads 61, 61 provided with horizontal openings to receive the bar and jointed to clevises 62, 62, which clevises are in turn jointed to the forward ends of the beams on vertical axes. My improvement, in this connection, consists in the means for connecting the draft heads with the clevises, in order to admit of a free, universal movement of the parts relatively to each other as they assume different relative positions when the beams are alternately raised and lowered, and alternately shifted relatively longitudinally. My improvement consists in connecting the heads 61 to the clevises by ball and socket joints, each head being provided with a ball 61ᵃ which is seated for universal movement in a spherical socket 62ᵃ in the associated clevis. As a result of this construction the draft bar is permitted to assume alternately oppositely inclined positions, as the plow beams are alternately raised and lowered, and in such movements are alternately shifted longitudinally endwise, and this without liability of cramping or binding of the parts. The draft animals are usually hitched to the bar by means of a draft ring 63 which is mounted loosely on the bar so that it may run freely from one end to the other according to the plow which for the time being is in action.

Having thus described my invention, what I claim is:

1. In a plow, the combination of a frame, a swinging bail pivotally mounted on the frame and carrying a plow beam, a ground wheel journaled on the bail and movable therewith, a lifting lever movable about the pivotal axis of the bail and operatively connected with the bail, a plunger mounted on said lever and adapted to coöperate with the ground wheel in effecting the lifting movement of the lever, a rocking operating member for said plunger mounted on the pivotal axis of the bail and operatively connected with the plunger, means for actuating said operating member, and a segment frame fixed relatively to the frame of the machine, and with which the lifting lever is adapted to coöperate.

2. In a plow, the combination of a frame, a bail mounted thereon to swing about an axis and carrying a plow beam, a ground wheel journaled on the bail and movable therewith, a lifting lever movable about the pivotal axis of the bail and operatively connected with the latter, a plunger mounted on the lever and adapted to coöperate with the ground wheel in effecting the lifting movement of the lever, an elbow lever mounted on the pivotal axis of the bail and operatively connected with the plunger, a foot lever mounted on the frame of the machine and operatively connected with the elbow lever, and a segment frame fixed relatively to the frame of the machine, and with which said lifting lever is adapted to coöperate.

3. In a plow, the combination of a frame, a plow beam movable upwardly by the draft applied to propel the machine, a swinging lifting lever, a slide on the lever provided with a socket, a roller mounted loosely in the socket, a plunger connected with the slide and adapted, when projected, to control the action of the draft in raising the beam, a segmental frame on which said roller travels in the swinging movements of the lever, and a cam on the segmental frame adapted to be engaged by the roller, and acting by such engagement to retract the plunger.

In testimony whereof, I have affixed my signature in presence of two witnesses.

BENJAMIN B. WALLACE.

Witnesses:
H. S. BETTS,
WM. J. MERKLE.